March 27, 1956 G. L. KEHL ET AL 2,739,935
ELECTROLYTIC CUTTING OF METALS
Filed Sept. 30, 1952
FIG. 1.
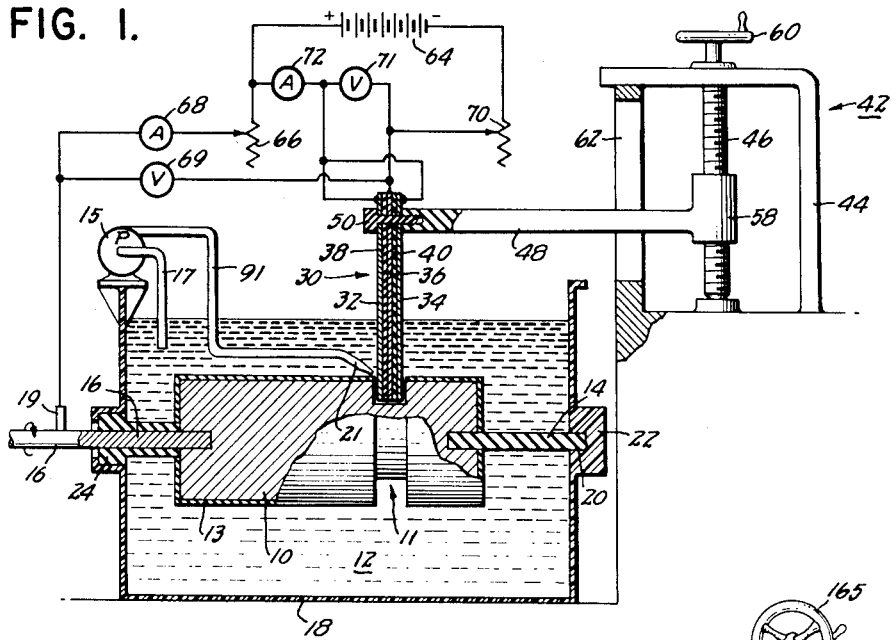
FIG. 2.
FIG. 3.
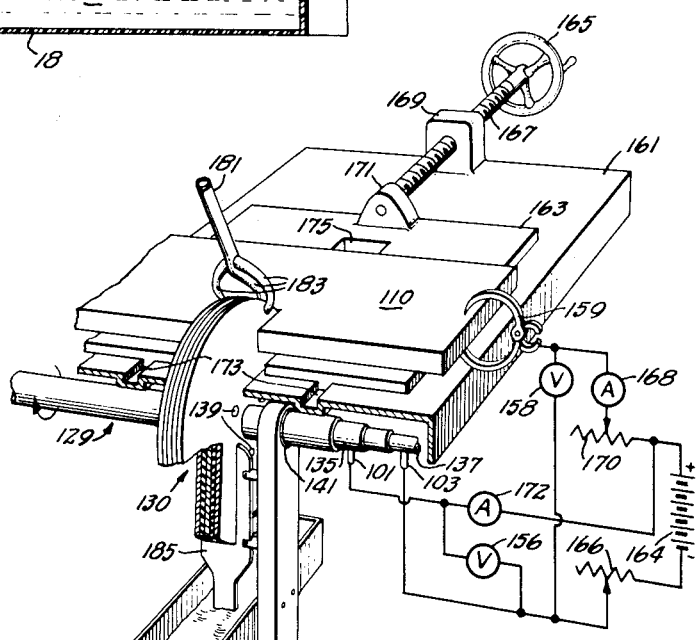
INVENTORS
GEORGE L. KEHL
IRVING MOCH JR.
BY
Roland G. Anderson
ATTORNEY

United States Patent Office 2,739,935
Patented Mar. 27, 1956

2,739,935

ELECTROLYTIC CUTTING OF METALS

George L. Kehl, Leonia, N. J., and Irving Moch, Jr., New York, N. Y., assignors to the United States of America as represented by the United States Atomic Energy Commission Application September 30, 1952, Serial No. 312,328

9 Claims. (Cl. 204—143)

The present invention relates to a method and apparatus for cutting metals electrolytically.

There are numerous conventional methods for cutting metals, most of which have their own particular value when employed in cutting metals of a selected character. The present method has particular value in cutting metals which are subject to electrolytic attack by electrolyzing solutions. As known, this includes a very broad range of metals and metal alloys, and thus gives a widespread utility to the present invention. A number of advantages are obtained from the use of the present method and apparatus when a comparison is made with the conventional mechanical or heating methods of producing cuts in metals. One principal advantage is the production of a cut which is free from mechanical or thermal strain and which thus retains the grain structure which it had prior to the cutting. Another advantage is that no metal is lost in the form of a dust formed from filings or in the form of a vapor evaporated or burnt away by the high temperature of cutting flames. Still another advantage is the absence of burrs or jagged edges in the region where the cut is produced.

One of the objects of the present invention is to provide a method of producing cuts in metals havinge these advantageous properties. Another object of the present invention is to provide apparatus which makes possible the achievement of these advantages. Other objects and advantages will be in part pointed out and in part obvious in the description which follows.

For reasons of clarity, the description of the method and apparatus is made with reference to the accompanying illustrative drawing wherein:

Figure 1 is a circuit diagram and schematic representation, in part in section, of an apparatus useful in carrying out the present invention.

Figure 2 is a circuit diagram and perspective view, also in part sectioned, illustrating an alternate apparatus useful in carrying out the present invention, and Figure 3 is an expanded sectional view of one detail of Figure 2.

It will be understood, however, that the scope of the invention is not limited to the illustrative examples shown.

Reference is first made to Figure 1, wherein the metal object to be cut is shown as a cylindrical bar member 10. The bar is supported in a bath of electrolyte 12 by means of two supporting chucks or rods 14 and 16 which are illustrated as inserted into like-sized, axially-located recesses in each end of the bar member 10. Any other convenient means by which the work may be rotatably supported may, of course, be substituted. The solution 12 is contained within a vessel 18, preferably composed of wood, glass or other non-conducting substance. Rod 16, here shown as the member for rotating the work piece, and comprising a conductive material, extends through a non-conducting packing material 24 which is fitted into a conforming recess in one end of vessel 18. A portion of the rod 16 extending externally to the vessel is connected to a suitably controlled, rotating means not shown.

The packing 24 prevents escape of the liquid electrolyte 12 from the vessel 18, but permits the rod 16 to be easily rotated by the external rotating means and thus to impart rotary motion to the bar member 10. Rod 14 which supports the other end of bar member 10 is composed of a non-conductive material and is itself rotatably supported in a like-sized socket 20 in a boss 22 provided in one wall of the vessel 18.

In accordance with the present invention, the special electrode indicated generally, and in greatly enlarged relative proportions, by the reference 30, is used to electrically cut the rotating bar member 10. This electrode is made up of three layers of conductive material; two outer layers 32 and 34 and a central layer 36, and two layers of non-conductive material 38 and 40 which separate and insulate the conductive material 38 and 40 which separate and insulate the conductive layers from each other. These five layers are preferably made to adhere to each other to form an electrode "sandwich," as will be described below. In order to position this electrode 30 properly with respect to the article 10 to be cut, any suitable means for supporting and adjusting the position of the electrode 30 may be employed. A schematic representation of one such device in the form of a screw-operated means indicated generally by the reference 42. It comprises a frame 44, a height-adjusting screw 46 and an electrode supporting arm 48. The electrode 30 may be fastened to the internally threaded end of the insulating plastic supporting rod 48 by means of the insulating plastic screw 50. The other end of the arm 48 terminates in a vertically extending, internally threaded, cylindrical sleeve 58. The electrode supporting arm and sleeve are caused to move vertically due to rotation of the screw 46 by the rotation of the wheel 60 attached to the upper end of screw 46. Both ends of the threaded potrion of screw 46 are rotatably secured in sockets at the upper and lower portions of the supporting frame 44. Lateral motion of the arm 48 is prevented by the restrictive contact with the vertically extending slot 62 in the wall of the frame 44 through which rod 48 extends.

The rod 10 is cut by impressing suitable voltages on the work 10 and electrodes, as will next be described. However, it should first be pointed out that in conventional electrolytic practice, a voltage established between an electrode and a metal member will act to dissolve the entire exposed surface of the member. That is, what would normally occur when a metal rod such as 10 is made anodic and subjected to electrolytic attack in a suitable electrolyzing solution, is a dissolution of the entire exposed portion of the rod. This may be limited to some extent, as shown by coating the rod 10 with a non-conductive coating 13. However, once the cutting is started, the side walls produced as the cut grows deeper may be severely attacked electrolytically so as to produce a V-shaped cut instead of the slot-shaped cut indicated generally by reference 11. This tendency to "undercut" is overcome according to the present invention, however, by concentrating the electrolyzing current at a particular portion of the rod through a unique cathode assembly so that a portion of the metal, roughly equivalent to what would be removed by a mechanical saw, is subjected to the electrolytic attack. Concentration of the current is achieved by providing "robber" electrodes 32 and 34 on each side of the cutting electrode 36 and suitably connecting these electrodes so that the difference in potential between the work and robber electrodes (which are usually positive with respect to the cutting electrode) is small as compared with the difference in potential between the work and the cutting electrode 36.

The electrical circuit which may be used in applying these voltages is diagrammatically illustrated in Figure 1.

It comprises a source of potential 64 which is connected from its positive terminal through a variable resistance 66, an ammeter 68, and an electrical brush contact 19, to the extension of rod 16 external to the vessel 18. The negative terminal of the voltage source 64 is connected through a variable resistance 70 to the central cutting electrode 36. The positive terminal of the voltage source 64 is also connected through the ammeter 72 to the robber electrodes 32 and 34. It will be noted that by this arrangement the robber electrodes will be maintained at a slightly higher potential than the work. The robber electrodes may also be maintained at a slightly lower potential than the work without departing from the scope of the present invention. The question of whether the robber electrodes or the work should be maintained at the higher potential depends on the metal to be cut, the electrolyte used, and a number of other factors. Whether better results are obtained with the higher or lower robber potential may be determined quite simply by adjustment of the potentials and observation of the results. The significant factor concerning setting the potentials is that the difference in potential between the cutting electrode and either the robber electrodes or the work must be large as compared to the difference in potential between the robber electrodes and the work. Although it is not precisely known why the apparatus as described is capable of producing defined cuts in a metal member such as bar 10 rather than a general electrolytic attack thereof, it is thought that the robber electrodes 32 and 34 act to prevent a divergence of current flow to the anode bar in any region other than that directly beneath the cutting edge of the electrode 30.

In the operation of the device, a potential is established between the cathode 36 and the rod 10, and between the cathode and robber electrodes, and the variable resistance 66 and 70 are adjusted to provide a desired ratio of the current flowing from cathode to article 10 to the current flowing from cathode to robber anodes 32 and 34. This ratio will, of course, vary depending on the metals and electrolyte used, the geometry of the apparatus, and other factors. The test which may be used in determining whether the current ratio and other factors are as desired is the character of the deposit produced on the cathode. According to one preferred method of carrying out the present invention, the several factors including voltages, currents, electrolyte composition, and temperature are set so that any metal depositing at the cathode is of a loosely adherent or fluffy character, which may be easily removed therefrom. Thus, according to the preferred mode of operation of the illustrative device, the potentials are established between the cathode 36 and rod 10 and between the cathode 36 and robber electrodes 32 and 34, and the variable resistances 66 and 70 are adjusted to provide a ratio of the current flowing between the cathode and rod to the current flowing between the cathode and robber electrodes such that the deposit of metal at the cathode is of a loosely adherent, fluffy character.

When such a deposit is formed, means for removing it from the cutting surface should preferably be provided so that the deposit may be removed at the same rate that it is formed. In the illustrative apparatus shown in Figure 1, this means is provided in the form of a jet of the electrolyte which is directed against the cutting edge in the region where the cut is being formed, that is, in the region between the cutting edge and the work. This jet is provided by pumping the electrolyte from the vessel 18 through the pipe 17, the pump 15 and the pipe 91 to the nozzle 21 which is positioned to direct the stream of electrolyte into the region where the cut is being formed. Other means for removing deposited metal can obviously be employed.

A slight separation is maintained between the work and cutting electrode, so that the cutting proceeds by an electrolytic action. This spacing affects the resistance of the electrical system because the electrolyte is the only electrical path between the cutting electrode and the work and the resistance of the electrolyte increases with increased spacing therebetween. It is therefore preferable, once the desired current ratio and related resistance settings of the variable resistances 66 and 70 have been determined (so that a fluffy deposit of metal occurs), to maintain the spacing approximately constant. This may be most conveniently carried out by regulating the advance of the electrode 30 so that the reading on the ammeters 68 and 72 and that on the voltmeters 69 and 71 are maintained approximately constant. Other means, such as visual sighting, may of course be employed.

It will be noted that the robber anodes 32 and 34 are maintained at a potential which is sufficiently close to that on the work to subject them to electrolytic attack. They are, as their name indicates, anodic with respect to the cutting cathode 36. It is therefore necessary that they be made of a material capable of resisting electrolytic attack in the particular electrolyte used. Platinum and the other noble metals are particularly suitable as ingredients of such robber anodes. Copper or other highly conductive material may be used for the cutting cathode 36, since it is not at a potential which would subject it to electrolytic attack. Caution must be observed only to be sure it does not dissolve appreciably in the electrolyte used. Stainless steel might be substituted, for example, when corrosive electrolytes are used.

Although the nozzle 21 is illustrated as stationary in Figure 1, it may be made to advance as the cutting region is advanced, as is illustrated by the nozzles 183 of Figure 2.

In the cutting of a one-inch diameter, low carbon, steel bar using an apparatus similar to that shown in Figure 1, a clean, sharp cut may be produced by using one normal sulfuric acid as an electrolyte, and a current ratio of 9.1 amps. to 0.15 amp. for the current flowing between the cutting electrode and the robber anodes as compared to the current flowing between the cathode electrode and the work.

A modification of the apparatus is described with particular reference to Figures 2 and 3. Figure 3 illustrates an expanded sectional view of the electrode such as that drawn in place in Figure 2. In this modification the electrode is designed to rotate, whereas in the modification of Figure 1, the work was made to rotate. As may be seen from Figure 3, the rotatable electrode comprises a sandwich of three conducting planes separated by two insulating plates. The innermost plate 136 makes electrical contact with the conducting core 137 of the shaft used to rotatably support and impart rotary motion to the electrode 130. The two outer plates 132 and 134 are electrically connected through the conducting rivet 139 and thus both make electrical contact with a conducting sleeve 135 which connects with a source of potential as will be described below with reference to Figure 2. The shaft core 137 is insulated from the conducting sleeve 135 by the insulating sleeve 133. A second insulating sleeve 131, concentric with the first and located outward therefrom, forms a protective coating to insulate the conducting sleeve 135 from the shaft support 199 seen in Figure 2. As may also be seen in Figure 2, a bearing 141 is attached to the outer insulating sleeve 131 at the point where it is supported by the shaft support 199 to prevent frictional wear of sleeve 131 as the shaft is rotated. The two electrode insulating layers or spacers 138 and 140 of the sandwich electrode 130 correspond to the insulating layers 38 and 40 of sandwich 30 of Figure 1 and similarly serve to insulate the conducting layers of the sandwich from each other. It is apparent from Figure 2 that there are three evenly spaced rivets 139 providing electrical contact between the robber anodes 132 and 134. These rivets 139 are insulated from the cutting electrode 136 by the extension of insulating spacer 140 through likesized holes in the cutting electrode 136.

Referring now particularly to Figure 2, the cutting electrode 130 in disc form is illustrated in its relation to the mechanical and electrical components of an illustrative apparatus useful in carrying out the method of the present invention. As illustrated, the disc is seen to be supported on a rotatable shaft 129. Means for rotating the shaft (not shown) are attached to the extension of the shaft to the left of the disc. The extension of the shaft on the righthand side of the disc is rotatably supported by the bearing 141 resting in a conforming hole in the top of support member 199. The electrical connections to the shaft core 137 and conducting sleeve 135 are made at the stepped terminal of the shaft at the extreme right thereof. As illustrated in Figure 2, an electrical connection is made from the positive terminal of the source 164 through an ammeter 172 and a brush contact 101 to the conducting sleeve 135 and thus to the robber electrodes 132 and 134 (seen best in Figure 3). Electrical connection is made between the negative terminal of the potential source 164 through a variable restance 166 and brush contact 103 to the shaft core 137. An electrical connection is made from the positive terminal of the voltage source 164 through variable resistance 170, ammeter 168, and clamp 159 to the work 110 which in this illustration is shown in the form of a flat bar or slab. Since it is the disc electrode 130 and not the work 110 which rotates in this illustration, it is necessary to provide means for feeding the work 110 into the rotating electrode. This means is illustrated in Figure 2 as a table 161 provided with an advancing platform 163.

The work 110 is positioned on the platform 163 and the platform is caused to advance by rotation of a hand wheel 165 which is fixed to one end of a screw member 167. The screw member passes through the internally threaded, vertically extended boss 169, and terminates in a suitable socket in the vertically extended boss 171. The boss 169 is attached to the table 161 and the boss 171 is attached to the platform 163 so that the screw member communicating therebetween provides a screw drive for advancing the platform over the surface of the table 161. A tongue and groove guide 173 is provided on each side of the rotating electrode 130, so that the advancement of the platform on the table may be properly directed. A slot 175 is provided in the platform 163 to accommodate the electrode as the work is advanced toward the same. This means for advancing the work is comparable to the electrode positioning means of Figure 1. Obviously, other means for feeding the work and for activating the feeding mechanism may be substituted. The reading on ammeters 168 and 172 and on the voltmeters 158 and 156 may be used in regulating the advancement of the work.

In order to provide the necessary electrolyte for the electrolytic attack on the cutting disc 130, a jet of electrolyte is directed along the cutting portion of the disc 130. This jet may be supplied much in the manner in which a cutting oil is supplied to the region of cutting when a conventional, mechanical cutting means, such as a saw, is employed. As illustrated in this embodiment in Figure 2, this means may comprise an electrolyte-delivering conduit 181 communicating with a reservoir (not shown) and having three nozzles 183 positioned to deliver electrolyte to the front of the disc against which the work is advanced and to both sides of the cutting disc in the region in which the cut is formed. An insulating coating similar to the coating 13 of Figure 1 or means for confining the electrolyte to the region to be cut and to thus prevent electrolytic attack of the other portions of the work 110 may also be provided. In order to prevent the electrolyte from being splattered, a wiper 185 extending upwardly from beneath the disc and making contact with both side surfaces and the edge thereof may be disposed so as to removed electrolyte from the wheel as it rotates. This wiper may also serve to remove loosely deposited fluffy metal. A trough 187 may be positioned beneath the wiper 185 to receive the electrolyte flowing thereto and thus to assist in recovering the electrolyte. This electrolyte may be drained from the drain pipe 189 and recirculated to the electrolyte-delivering conduit 181 by a pump (not shown). The wiper 185 and trough 187 are illustrated as supported by the shaft support 199.

In the operation of the device, a positive potential is established on both the robber electrodes 132 and 134 and the work 110, and a negative potential is established on the cutting electrode 136. Electrolyte is fed as a jet to the cutting region and the screw drive 167 is operated to advance the work 110 toward the cutting edge of the disc 130.

Since many embodiments might be made of the present invention and since many changes might be made in the embodiment described, it is to be understood that the foregoing description is to be interpreted as illustrative only and not in a limiting sense.

We claim:

1. In a method of cutting a metal electrolytically the steps which comprise, defining the region of said metal to be cut, supplying an electrolyte to the defined region, supplying an electrolyzing current to said region through a cathodic cutting electrode and through said electrolyte, and establishing an auxiliary voltage in electrodes disposed proximate said defined region to conductively remove at least a portion of the supplied current diverging from said region through said electrolyte.

2. The method of cutting a metal electrolytically which comprises establishing an electrolyzing voltage to make a cutting electrode cathodic and to make the metal to be cut anodic, aligning and closely spacing the cutting edge of the cathodic electrode to the region of the metal to be cut, effective relative motion between said electrode and said metal, flowing an electrolyte through the space between said cutting edge and said region, and establishing an auxiliary voltage in electrodes disposed proximate said cathodic electrode to conductively remove at least a portion of the supplied current diverging from said region through said electrolyte.

3. The method of cutting a metal electrolytically which comprises establishing an electrolyzing voltage to make a cutting electrode cathodic and to make the metal to be cut anodic, aligning and closely spacing the cutting edge of said cathodic electrode to the region of the metal to be cut, effecting relative motion between said electrode and said metal, flowing an electrolyte through the space between said cutting edge and the metal in said region, establishing a second voltage to make an auxiliary electrode anodic to the cutting electrode to conductively remove at least a portion of the supplied current diverging from said region through said electrolyte regulating the flow of current so that the ratio of the current flowing to said region to that removed is relatively large and regulating the advance of the cutting electrode into said region so that said ratio is maintained approximately constant.

4. A method of cutting a metal specimen electrolytically which comprises supplying an electrolyte to the region of said metal to be cut, supplying an electrolyzing current to said region through said electrolyte, effecting relative motion between the current supplying electrode and said metal, establishing an auxiliary voltage in electrodes disposed proximate said current supplying electrode to conductively remove at least a portion of the supplied current diverging from said region through said electrolyte adjusting the ratio of the supplied current to the removed current so that metal removed from said region is deposited in a loosely adherent form, and adjusting the depth of the electrolyte through which the supplied current must flow to maintain said ratio approximately constant.

5. Apparatus for cutting a metal electrolytically which comprises means for rendering said metal anodic, means for supplying electrolyte to the region of said metal to be cut, cathodic cutting means positioned to deliver an electrolyzing current to said region through the electrolyte passing therebetween and auxiliary electrode means for removing current diverging from said region through said electrolyte.

6. Apparatus for cutting a metal electrolytically which comprises means for rendering said metal anodic, means for supplying electrolyte to the region of said metal to be cut, cathodic cutting means positioned to deliver an electrolyzing current to said region through the electrolyte passing therebetween, auxiliary electrode means for removing current diverging from said region through said electrolyte and means for causing relative motion between the metal to be cut and the cutting means so as to continuously confront different surfaces of said region and cathodic cutting means.

7. Apparatus for cutting a metal electrolytically which comprises means for rendering said metal anodic, means for supplying electrolyte to the region of said metal to be cut, rotatable cathodic cutting means positioned to deliver an electrolyzing current to said region through the electrolyte passing therebetween, auxiliary electrode means for removing current diverging from said region through said electrolyte, means for maintaining a relatively constant separation between the cutting edge of said rotatable cathodic cutting means and the metal in said region, and means for removing any deposit formed on said cutting means.

8. Apparatus for cutting a metal electrolytically which comprises means for rendering said metal anodic, means for supplying electrolyte to the region of said metal to be cut, cathodic cutting means positioned to deliver an electrolyzing current to said region through the electrolyte passing therebetween, auxiliary electrode means for removing current diverging from said region through said electrolyte, means for rotating said metal, means for maintaining a relatively constant separation between the cutting edge of said cathodic cutting means and the metal in said region, and means for removing any deposit formed on said cutting means.

9. In apparatus for cutting metals electrolytically a cathode assembly comprising a sandwich of three conductive elements separated by two insulating elements, said elements being in sheet form and of similar outline, and means for supplying current to the conductive central member of said sandwich at a first potential and for supplying current to the conductive outer elements at a second potential.

References Cited in the file of this patent

UNITED STATES PATENTS

| 916,033 | Schmidt | Mar. 23, 1909 |
| 1,910,150 | Cowper-Coles | May 23, 1933 |
| 2,536,912 | Corbett | Jan. 2, 1951 |

FOREIGN PATENTS

| 335,003 | Great Britain | Sept. 18, 1930 |

OTHER REFERENCES

"Steel," vol. 130, No. 3, March 17, 1952, pages 84–86.